(12) United States Patent
Chung et al.

(10) Patent No.: US 8,813,226 B2
(45) Date of Patent: Aug. 19, 2014

(54) DEFENSE METHOD AND DEVICE AGAINST INTELLIGENT BOTS USING MASQUERADED VIRTUAL MACHINE INFORMATION

(75) Inventors: Yoon Jung Chung, Daegu (KR); Yo Sik Kim, Daejeon (KR); Won Ho Kim, Daejeon (KR); Dong Soo Kim, Daejeon (KR); Sang Kyun Noh, Gwangju (KR); Young Tae Yun, Daejeon (KR); Cheol Won Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 551 days.

(21) Appl. No.: 12/879,691

(22) Filed: Sep. 10, 2010

(65) Prior Publication Data

US 2011/0271342 A1 Nov. 3, 2011

(30) Foreign Application Priority Data

Apr. 28, 2010 (KR) .......................... 10-2010-0039358

(51) Int. Cl.
| | |
|---|---|
| *G06F 21/00* | (2013.01) |
| *G06F 21/56* | (2013.01) |
| *G06F 9/455* | (2006.01) |
| *G06F 21/55* | (2013.01) |
| *H04L 29/06* | (2006.01) |

(52) U.S. Cl.
CPC .............. *G06F 21/566* (2013.01); *G06F 9/455* (2013.01); *G06F 21/55* (2013.01); *G06F 21/554* (2013.01); *G06F 21/56* (2013.01); *G06F 2212/151* (2013.01); *H04L 29/06877* (2013.01); *H04L 29/06891* (2013.01); *H04L 29/06911* (2013.01); *H04L 29/06918* (2013.01); *H04L 63/14* (2013.01); *H04L 63/1416* (2013.01); *H04L 63/1441* (2013.01); *H04L 2463/144* (2013.01)

USPC ................... 726/24; 726/22; 726/23; 726/25; 713/187; 713/188

(58) Field of Classification Search
CPC . G06F 21/05; G06F 2009/45; G06F 2212/15; G06F 9/45; H04L 29/068; H04L 29/069; H04L 63/14; H04L 2463/144
USPC ............................... 726/22–25; 713/187–188
See application file for complete search history.

(56) References Cited

U.S. PATENT DOCUMENTS

| | | | |
|---|---|---|---|
| 7,941,850 B1* | 5/2011 | Satish ............................ | 726/22 |
| 2004/0064737 A1 | 4/2004 | Milliken et al. | |

(Continued)

FOREIGN PATENT DOCUMENTS

| | | |
|---|---|---|
| EP | 1870830 A1 | 12/2007 |
| JP | 2006-127497 A | 5/2006 |

(Continued)

OTHER PUBLICATIONS

Detection of VM-Aware Malware bu Zhu et al; Publisher: University of California, Berkley; Date: Dec. 11, 2007.*

(Continued)

*Primary Examiner* — Madhuri Herzog
(74) *Attorney, Agent, or Firm* — LRK Patent Law Firm

(57) ABSTRACT

A defense method and device against intelligent bots using masqueraded virtual machine information are provided. The method includes performing global hooking on a virtual machine detection request transmitted by a process, determining, on the basis of pre-stored malicious process information, whether or not the process transmitting the virtual machine detection request corresponds to a malicious process, and when the process is found to correspond to the malicious process as a result of the determination, determining that the process is generated by the intelligent bot, and returning the masqueraded virtual machine information to the process.

12 Claims, 3 Drawing Sheets

(56) References Cited

U.S. PATENT DOCUMENTS

| | | |
|---|---|---|
| 2005/0076237 A1 | 4/2005 | Cohen et al. |
| 2006/0095971 A1 | 5/2006 | Costea et al. |
| 2006/0242709 A1* | 10/2006 | Seinfeld et al. ............ 726/24 |
| 2008/0141376 A1* | 6/2008 | Clausen et al. ............ 726/24 |
| 2009/0083852 A1* | 3/2009 | Kuo et al. ............ 726/22 |
| 2010/0107261 A1 | 4/2010 | Nagoya et al. |
| 2011/0138465 A1* | 6/2011 | Franklin et al. ............ 726/23 |
| 2011/0225655 A1* | 9/2011 | Niemela et al. ............ 726/24 |

FOREIGN PATENT DOCUMENTS

| | | |
|---|---|---|
| JP | 2008-176352 A | 7/2008 |
| JP | 2009-031859 A | 2/2009 |
| JP | 2010-020713 A | 1/2010 |
| JP | 2010-134536 A | 6/2010 |
| KR | 10-2006-0035680 A | 4/2006 |
| KR | 10-0609710 B1 | 8/2006 |
| KR | 10-0927240 B1 | 11/2009 |
| WO | 2008/023423 A1 | 2/2008 |

OTHER PUBLICATIONS

Measuring virtual machine detection in malware using DSD tracer by Lau et al; Publisher: Springer-Verlag; Date: Aug. 5, 2008.*
On the Cutting Edge: Thwarting Virtual Machine Detection by Liston et al; Publisher: Intelguardians; Year: 2006.*
Towards an Understanding of Anti-virtualization and Anti-debugging Behavior in Modern Malware by Chen et al; Publisher: IEEE; Year: 2008.*
Emulating Emulation-Resistant Malware by Kang et al; Publisher: ACM; Date: Nov. 9, 2009.*
Measuring virtual machine detection in malware using DSD tracer by Lau et al; Publisher: Springer-Verlag France; Year: 2008.*
Zheng Bu et al., "Virtualization and Security," pp. 15, 2008.
Takashi Miyake et al., "A Method to Detect Unknown Computer Virus Using Virtual Server," Technical Report of IEICE, vol. 102, No. 211, pp. 48, Jul. 2002.

* cited by examiner

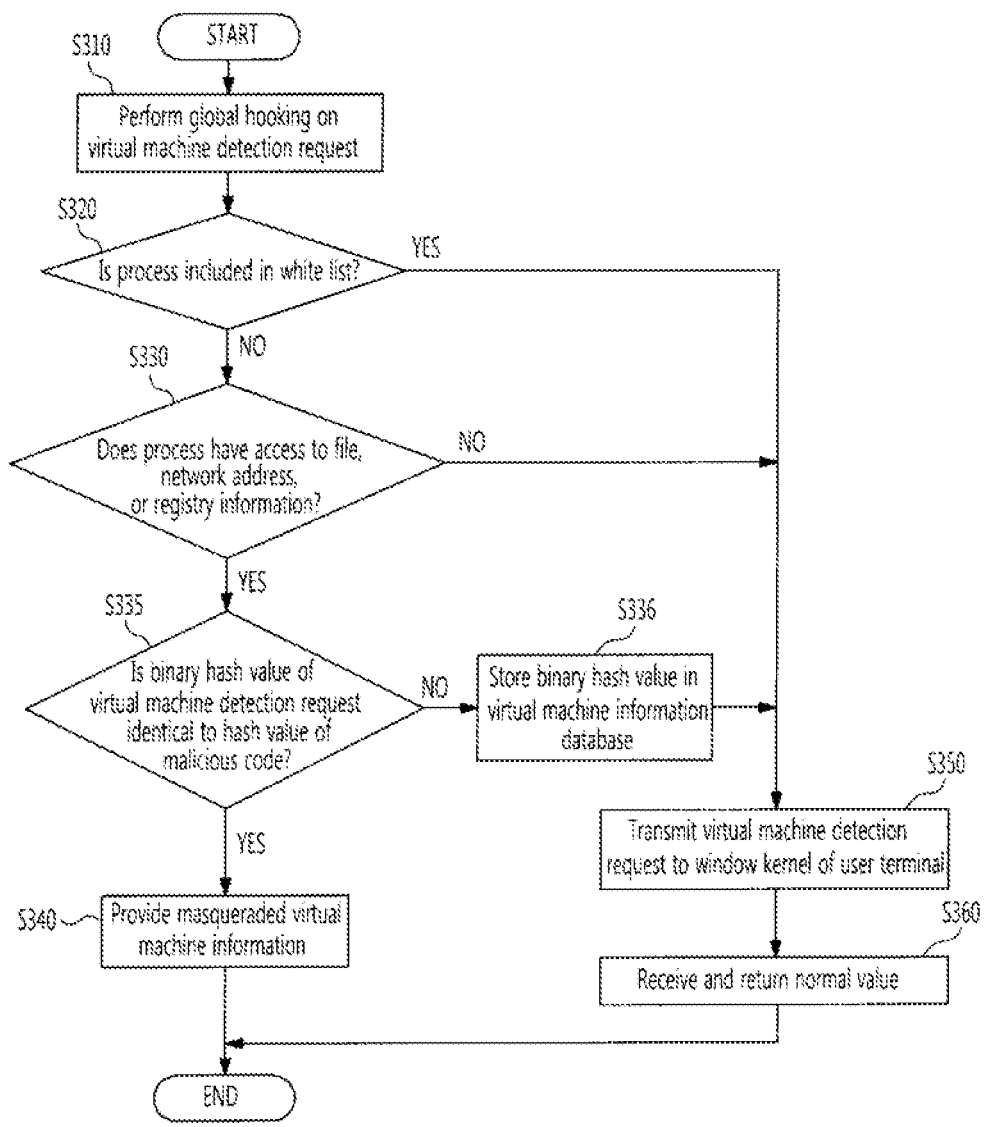

DEFENSE METHOD AND DEVICE AGAINST INTELLIGENT BOTS USING MASQUERADED VIRTUAL MACHINE INFORMATION

CROSS-REFERENCE TO RELATED APPLICATION

This application claims priority to and the benefit of Korean Patent Application No. 10-2010-0039358, filed Apr. 28, 2010, the disclosure of which is incorporated herein by reference in its entirety.

BACKGROUND

The present invention relates to a defense method and device against intelligent bots using masqueraded virtual machine information. More specifically, the present invention relates to a defense method and device against intelligent bots using masqueraded virtual machine information for stopping malicious processes of the intelligent bots.

DISCUSSION OF RELATED ART

Intelligent bots refer to programs that periodically collect information or carry out services without direct participation of a user. In general, such intelligent bots search a terminal connected to the Internet using parameters provided by a user, collect information in which the user has an interest, and provide the collected information to the user. However, these intelligent bots by nature may he used for malicious behaviors according to a user's intent.

Accordingly, to analyze the malicious behaviors using these intelligent bots, security experts execute a virtual machine, and cause the intelligent bot to be executed on the virtual machine, thereby analyzing and tracing the malicious behaviors.

However, to cope with this analyzing and tracing method based on the execution of the virtual machine, producers of the intelligent bots make use of a method of detecting the execution of the virtual machine. According to this method of detecting the execution of the virtual machine, it is detected whether or not the intelligent bot is executed on the virtual machine, and if it is determined that the intelligent bot is executed on the virtual machine, the intelligent bot is terminated without conducting any malicious behavior.

SUMMARY OF THE INVENTION

The present invention is directed to a defense method and device against intelligent bots using masqueraded virtual machine information, in which the intelligent bot detecting execution of a virtual machine is provided with masqueraded virtual machine information so as to determine that it is operated on the virtual machine to stop its malicious process, thereby preventing damages such as a distributed denial-of-service (DDoS) attack or information leakage by causing the intelligent bot not to conduct a malicious process even when a user terminal is infected with the intelligent bot.

One aspect of the present invention provides a defense method against intelligent bots using masqueraded virtual machine information. The method includes: performing global hooking on a virtual machine detection request transmitted by a process; determining, on the basis of pre-stored malicious process information, whether or not the process transmitting the virtual machine detection request corresponds to a malicious process; and when the process is found to correspond to the malicious process as a result of the determination, determining that the process is generated by the intelligent bot, and returning the masqueraded virtual machine information to the process.

Determining, on the basis of pre-stored malicious process information, whether or not the process transmitting the virtual machine detection request corresponds to a malicious process may include determining whether or not the process corresponds to the malicious process of executing any one of access to a file of a user terminal, lookup of a network address of a virtual machine, and access to a registry of the user terminal.

Determining, on the basis of pre-stored malicious process information, whether or not the process transmitting the virtual machine detection request corresponds to a malicious process may further include determining whether or not the process is included in a white list that is a list of pre-stored normal processes.

Determining, on the basis of pre-stored malicious process information, whether or not the process transmitting the virtual machine detection request corresponds to a malicious process may further include determining whether or not a binary hash value of the virtual machine detection request is identical to a hash value of a pre-stored malicious code.

Determining, on the basis of pre-stored malicious process information, whether or not the process transmitting the virtual machine detection request corresponds to a malicious process may further include storing the binary hash value of the virtual machine detection request if the binary hash value is not identical to the hash value of the pre-stored malicious code.

The masqueraded virtual machine information may include at least one selected from masqueraded file information, masqueraded network address information, and masqueraded registry information, all of which are for masquerading as a state where a user terminal makes use of a virtual machine.

The method may further include: when the process is found not to correspond to the malicious process as a result of the determination, transmitting the virtual machine detection request to a window kernel of a user terminal; and receiving, a normal value of the virtual machine detection request from the window kernel of the user terminal, and returning the received value to the process.

Another aspect of the present invention provides a defense device against intelligent bots using masqueraded virtual machine information. The device includes: a virtual machine information database storing the masqueraded virtual machine information for masquerading as a state where a user terminal makes use of a virtual machine, and malicious process information for determining a malicious process; and a global hooking module performing global hooking on a virtual machine detection request of a process, determining, on the basis of the malicious process information stored in the virtual machine information database, whether or not the process transmitting the virtual machine detection request corresponds to a malicious process, and when the process is found to correspond to the malicious process as a result of the determination, returning the masqueraded virtual machine information stored in the virtual machine information database to the process.

The global hooking module may include: a file control module that, when the process has access to a file of the user terminal, determines the process as a malicious process on the basis of the malicious process information, receives the masqueraded file information for masquerading as the virtual machine from the virtual machine information database, and returns the received information to the process; a network control module that, when the process executes lookup of a virtual machine network address, determines the process as a malicious process on the basis of the malicious process information, receives the masqueraded network address information for masquerading as the virtual machine from the virtual machine information database, and returns the received information to the process and a registry control module that, when the process has access to a registry of the user terminal, determines the process as a malicious process on the basis of the malicious process information, receives the masqueraded registry information for masquerading as the virtual machine from the virtual machine information database, and returns the received information to the process.

The global hooking module may determine the process as a malicious process when the process is not included in a white list that is a list of normal processes stored in the virtual machine information database.

The global hooking module may determine the process as a malicious process when a binary hash value of the virtual machine detection request is identical to a hash value of a malicious code stored in the virtual machine information database.

The masqueraded virtual machine information may include at least one selected from masqueraded file information, masqueraded network address information, and masqueraded registry information, all of which are for masquerading as a state where the user terminal makes use of the virtual machine.

The malicious process information may be information for accessing at least one selected from a file of the user terminal, a network address of the virtual machine, and a registry of the user terminal.

When the process is found not to correspond to the malicious process as a result of the determination, the global hooking module may transmit the virtual machine detection request to a window kernel of a user terminal, receive a normal value of the virtual machine detection request from the window kernel of the user terminal, and return the received value to the process.

BRIEF DESCRIPTION OF THE DRAWINGS

The above and other objects features and advantages of the present invention will become more apparent to those of ordinary skill in the art by describing in detail exemplary embodiments thereof with reference to the attached drawings in which:

FIG. 3 is a flowchart for explaining a defense method against intelligent bots using masqueraded virtual machine information according to another exemplary embodiment of the present invention.

DETAILED DESCRIPTION OF EXEMPLARY EMBODIMENTS

Figure 1:
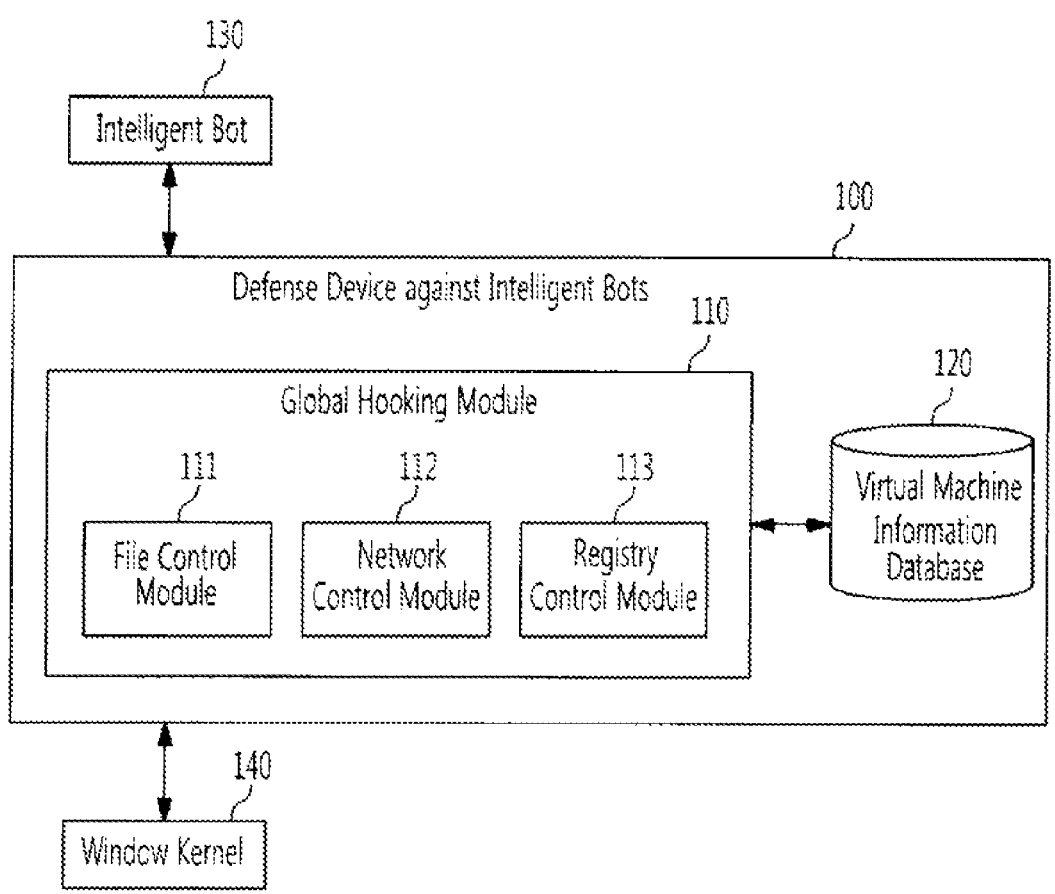
FIG. 1 illustrates the configuration of a defense device against intelligent bots using masqueraded virtual machine information according to an exemplary embodiment of the present invention.

The present invention will now be described more fully hereinafter with reference to the accompanying drawings, in which exemplary embodiments of the invention are shown. Throughout the drawings, it should be noted that the same reference numerals or symbols are used to designate like or equivalent elements having the same function. The detailed descriptions of known function and construction unnecessarily obscuring the subject matter of the present invention will be omitted.

FIG. 1 illustrates the configuration of a defense device against intelligent bots using masqueraded virtual machine information according to an exemplary embodiment of the present invention. The configuration of the defense device against intelligent bots u sing masqueraded virtual machine information will be described with reference to FIG. 1.

As illustrated in FIG. 1, a defense device 100 against intelligent bots includes a global hooking module 110 and a virtual machine information database 120.

To determine whether or not an intelligent bot 130 makes use of a virtual machine at a user terminal, a request to detect the virtual machine for executing a process is transmitted to the user terminal, and then the global hooking module 110 performs global hooking on the virtual machine detection request.

The global hooking module 110 determines whether or not the process transmitting the virtual machine detection request is a malicious process on the basis of malicious process information stored in the virtual machine information database 120.

The virtual machine information database 120 stores masqueraded virtual machine information for masquerading as the state where the user terminal makes use of the virtual machine, and the malicious process information for determining the malicious process. The malicious process information stored in the virtual machine information database 120 may be made up of information for providing access to at least one selected from a file of the user terminal, a network address of the virtual machine, and a registry of the user terminal.

Thus, when it is determined that the process is the malicious process, the global hooking module 110 reads the virtual machine information, which is for masquerading as the state where the user terminal makes use of the virtual machine, from the virtual machine information database 120, and then returns the read virtual machine information to the intelligent bot 130 executing the process. Here, the virtual machine information is stored in the virtual machine information database 120, and may include at least one selected from masqueraded file information, masqueraded network address information, and masqueraded registry information, all of which are for masquerading as the state where the user terminal makes use of the virtual machine.

Hereinafter, the global hooking module 110 will be described in greater detail.

The global hooking module 110 may includes a file control module 111, a network control module 112, and a registry control module 113.

When the process has access to the file of the user terminal, the file control module 111 determines the process as a malicious process with reference to the malicious process information stored in the virtual machine information database 120. Thus, the file control module 111 may receive the masqueraded file information for masquerading as the virtual machine from the virtual machine information database 120, and then return the received information to the intelligent bot 130 executing the process.

Further, when the process executes lookup of a virtual machine network address, the network control module 112 determines the process as a malicious process with reference to the malicious process information stored in the virtual machine information database 120. Thus, the network control module 112 may receive the masqueraded network address information for masquerading as the virtual machine from the virtual machine information database 120, and then return the received information to the intelligent bot 130 executing the process.

Further, when the process requests access to a registry of the user terminal, the registry control module 113 determines the process as a malicious process with reference to the malicious process information stored in the virtual machine information database 120. Thus, the registry control module 113 may receive the masqueraded registry information for masquerading as the virtual machine from the virtual machine information database 120, and then return the received information to the intelligent bot 130 executing the process.

In addition, the global hooking module 110 may be configured to determine the process as a malicious process when a binary hash value of the virtual machine detection request is identical to a hash value of the malicious code stored in the virtual machine information database 120.

Meanwhile, the global hooking module 110 may be configured to determine whether or not the process is included in a list of normal processes, i.e. a white list, stored in the virtual machine information database 120, and to execute the process of determining the malicious process as described above only when the process is not included in the white list as a result of the determination.

When it is determined that the process transmitting the virtual machine detection request is not the malicious process, or that the process is included in the white list, the global hooking module 110 may determine the process as a normal process. As described above, when the process is determined as the normal process, the global hooking machine 110 may transmit the virtual machine detection request to a window kernel 140 of the user terminal, receive a normal value of the virtual machine detection request from the window kernel 140 of the user terminal, and return the received value to the intelligent bot 130 executing the process.

Meanwhile, according to the exemplary embodiment of the present invention, the virtual machine detection request of the intelligent bot 130 may include a request intended for the virtual machine implemented in VMware or CW Sandbox.

Thus, according to the exemplary embodiment of the present invention, the masqueraded virtual machine information may be provided to determine that the intelligent bot detecting the operation of the virtual machine is operated on the virtual machine, thereby causing the intelligent bot to stop the malicious process.

Figure 2:
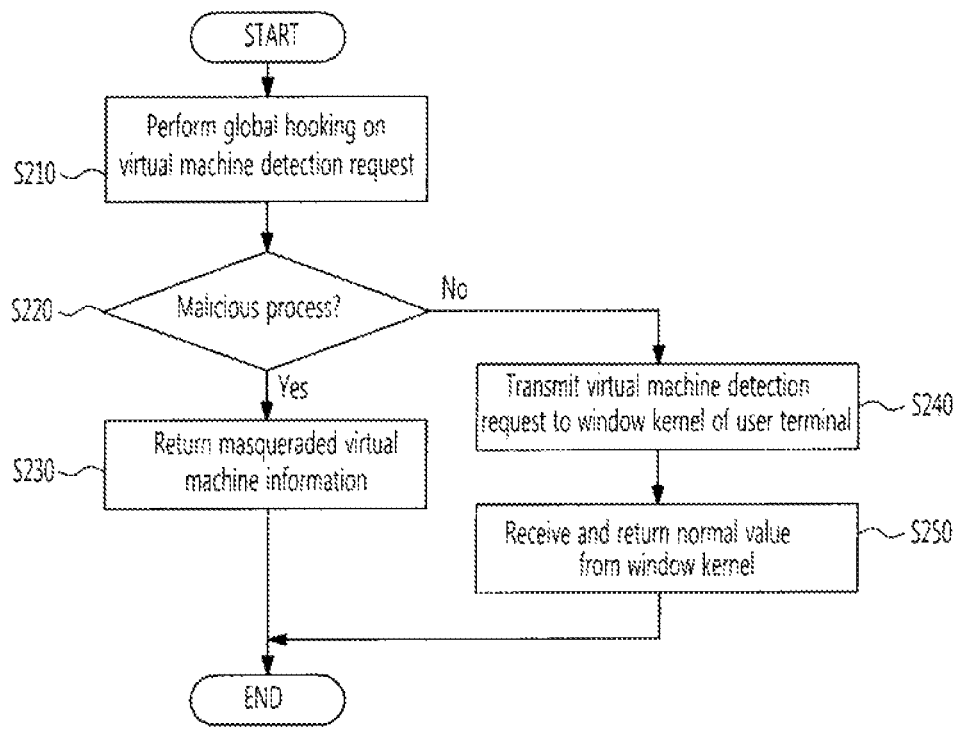
FIG. 2 is a flowchart for explaining a defense method against intelligent bots using masqueraded virtual machine information according to an exemplary embodiment of the present invention.

FIG. 2 is a flowchart for explaining a defense method against intelligent bots using masqueraded virtual machine information according to an exemplary embodiment of the present invention. The defense method against intelligent bots using masqueraded virtual machine information according to an exemplary embodiment of the present invention will be described with reference to FIG. 2.

According to an exemplary embodiment of the present invention, the defense device against intelligent bots performs global hooking on the virtual machine detection request of a process (S210).

The defense device against intelligent bots determines, on the basis of pre-stored malicious processes, whether or not the process transmitting the virtual machine detection request corresponds to a malicious process (S220).

As a result, if the process corresponds to the malicious process, the defense device against intelligent bots returns masqueraded virtual machine information to the process (S230). Here, the masqueraded virtual machine information is information for masquerading as the state where the user terminal makes use of the virtual machine.

Meanwhile, when it is determined that the process does not correspond to the malicious process, the defense device against intelligent bots may transmit the virtual machine detection request to the window kernel of the user terminal (S240). Afterwards, the defense device against intelligent bots may receive a normal value of the virtual machine detection request from the window kernel of the user terminal, and return the received value to the process (S250).

FIG. 3 is a flowchart for explaining a defense method against intelligent bots using masqueraded virtual machine information according to another exemplary embodiment of the present invention. The defense method against intelligent bots using masqueraded virtual machine information according to another exemplary embodiment of the present invention will described with reference to FIG. 3.

The defense device against intelligent bots may perform global hooking on the virtual machine detection request of a process (S310), and determine whether or not the process is included in a white list (S320). Here, the white list refers to a list of normal processes, and is stored in the virtual machine information database.

As a result of the determination, if the process is not included in the white list, the defense device against intelligent bots determines whether or not the process executes any one selected from access to a file of the user terminal, lookup of a network address of the virtual machine, and access to a registry of the user terminal (S330).

When it is determined that the process executes any one selected from access to a file of the user terminal, lookup of a network address of the virtual machine, and access to a registry of the user terminal, the defense device against intelligent bots can determine whether or not the process is a malicious process on the basis of whether or not a binary hash value of the virtual machine detection request is identical to a hash value of a malicious code stored in the virtual machine information database (S335).

For example, the defense device against intelligent bots may determine whether or not the process is a malicious process on the basis of whether or not the process has access to a media access control (MAC) address, such as 00-05-69-xx-xx-xx, 00-0c-29-xx-xx-xx, or 00-50-56-xx-xx-xx, which is used in the virtual machine, or on the basis of whether or not the process has access to the registry and then information such as a product identification (ID), a hard drive, a video drive, etc., which are used in the virtual machine.

As a result of the determination, when it is determined that the process is the malicious process because the virtual machine detection request corresponds to any one of the access to the file of the user terminal, the lookup of the network address of the virtual machine, and the access to the registry of the user terminal, and because the binary hash value of the virtual machine detection request is identical to the hash value of the malicious code, the defense device against intelligent bots returns masqueraded virtual machine information, which is for masquerading as the state where the user terminal makes use of the virtual machine, to the process (S340). Here, the masqueraded virtual machine information may include at least one of masqueraded file information, masqueraded network address information, and masqueraded registry information, all of which are for masquerading as the state where the user terminal makes use of the virtual machine.

Meanwhile, as a result of the determination, if it is determined that the process is included in the white list, that the virtual machine detection request does not correspond to any one of the access to the file of the user terminal, the lookup of the network address of the virtual machine, and the access to the registry of the user terminal, or that the binary hash value of the virtual machine detection request is riot identical to the hash value of the malicious code, the defense device against intelligent bots determines that the process does not correspond to the malicious process, and may transmit the virtual machine detection request to the window kernel of the user terminal (S350).

Further, if it is determined that the process is not included in the white list, that the virtual machine detection request corresponds to any one of the access to the file of the user terminal, the lookup of the network address of the virtual machine, and the access to the registry of the user terminal, and that the binary hash value of the virtual machine detection request is not identical to the hash value of the malicious code, the binary hash value of the virtual machine detection request is stored in the virtual machine information database (S336). Here, a separate external system analyzes processes for the file, registry, and network, and determines whether or not each process is the malicious process. If each process is the malicious process, the binary hash value is stored as the hash value of the malicious code in the virtual machine information database.

As a result, the defense device against intelligent bots may receive the normal value of the virtual machine detection request from the window kernel of the user terminal, and return the received value to the process (S360).

Thus, according to embodiments of the present invention, the masqueraded virtual machine information can be provided to the intelligent bot detecting the execution of the virtual machine such that the intelligent bot determines that the virtual machine is operated, thereby causing the intelligent bot to stop the malicious process. As such, according to embodiments of the present invention, even when the user terminal is infected with the intelligent bot, the intelligent bot is caused not to conduct its malicious process, so that it is possible to prevent secondary damages such as a distributed denial-of-service (DDoS) attack or information leakage.

The above-mentioned embodiments of the present invention may be implemented by arbitrary various methods. For example, the embodiments may be implemented as hardware including software, or hardware. If the embodiments are implemented as hardware including software, they may be implemented as the software executed on one or more processors using various operating systems or platforms. In addition, such software may be written using any of a number of suitable programming languages, and may also be compiled as executable machine language code or intermediate code that is executed on as framework or a virtual machine.

In this respect, the invention may be embodied as a computer readable medium (e.g., a computer memory, one or more floppy discs, compact discs, optical discs, magnetic tapes, flash memories, etc.) encoded with one or more programs that, when executed on one or more computers or other processors, perform methods that implement the above-mentioned various embodiments of the invention.

According to embodiments of the present invention, an intelligent bot detecting execution of a virtual machine is provided with masqueraded virtual machine information so as to determine that it is operated on the virtual machine to stop its malicious process, so that it is possible to prevent secondary damages such as a distributed denial-of-service (DDoS) attack or information leakage by causing the intelligent bot not to conduct a malicious process although a user terminal is infected with the intelligent bot.

In the drawings and specification, there have been disclosed typical exemplary embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A defense method against intelligent bots using masqueraded virtual machine information, the method comprising:

performing global hooking on a virtual machine detection request transmitted by a process;

determining, on the basis of pre-stored malicious process information, whether or not the process transmitting the virtual machine detection request corresponds to a malicious process; and when the process is found to correspond to the malicious process as a result of the determination, determining that the process is generated by an intelligent bot, and returning the masqueraded virtual machine information to the process, wherein the intelligent bot is configured to stop the malicious process upon receiving masqueraded virtual machine information, and wherein the masqueraded virtual machine information includes at least one selected from masqueraded file information, masqueraded network address information, and masqueraded registry information; and wherein the masqueraded file information, masqueraded network address information, and masqueraded registry information are to masquerade the state of a user terminal and to indicate use of a virtual machine.

2. The method of claim 1, wherein determining, on the basis of pre-stored malicious process information, whether or not the process transmitting the virtual machine detection request corresponds to a malicious process includes determining whether or not the process corresponds to the malicious process of executing any one of access to a file of a user terminal, lookup of a network address of a virtual machine, and access to a registry of the user terminal.

3. The method of claim 1, wherein determining, on the basis of pre-stored malicious process information, whether or not the process transmitting the virtual machine detection request corresponds to a malicious process further includes determining whether or not the process is included in a white list that is a list of pre-stored normal processes.

4. The method of claim 1, wherein determining, on the basis of pre-stored malicious process information, whether or not the process transmitting the virtual machine detection request corresponds to a malicious process further includes determining whether or not a binary hash value of the virtual machine detection request is identical to a hash value of a pre-stored malicious code.

5. The method of claim 4, wherein determining, on the basis of pre-stored malicious process information, whether or not the process transmitting the virtual machine detection request corresponds to a malicious process further includes storing the binary hash value of the virtual machine detection request if the binary hash value is not identical to the hash value of the pre-stored malicious code.

6. The method of claim 1, further comprising: when the process is found not to correspond to the malicious process as a result of the determination, transmitting the virtual machine detection request to a window kernel of a user terminal; and receiving a normal value of the virtual machine detection request from the window kernel of the user terminal, and returning the received value to the process.

7. A defense device executed on one or more hardware processors against intelligent bots using masqueraded virtual machine information, the device comprising:

a virtual machine information database storing the masqueraded virtual machine information for masquerading as a state where a user terminal makes use of a virtual machine, and malicious process information for determining a malicious process; and a global hooking module performing global hooking on a virtual machine detection request of a process, determining, on the basis of the malicious process information stored in the virtual machine information database, whether or not the process transmitting the virtual machine detection request corresponds to a malicious process, and when the process is found to correspond to the malicious process as a result of the determination, returning the masqueraded virtual machine information stored in the virtual machine information database to the process, wherein an intelligent bot is configured to stop the malicious process upon receiving masqueraded virtual machine information, and wherein the masqueraded virtual machine information includes at least one selected from masqueraded file information, masqueraded network address information, and masqueraded registry information; and wherein the masqueraded file information, masqueraded network address information, and masqueraded registry information are to masquerade the state of a user terminal and to indicate use of a virtual machine.

8. The device of claim 7, wherein the global hooking module includes:

a file control module that, when the process has access to a tile of the user terminal, determines the process as a malicious process on the basis of the malicious process information, receives the masqueraded file information for masquerading as the virtual machine from the virtual machine information database, and returns the received information to the process;

a network control module that, when the process executes lookup of a virtual machine network address, determines the process as a malicious process on the basis of the malicious process information, receives the masqueraded network address information for masquerading as the virtual machine from the virtual machine information database, and returns the received information to the process; and a registry control module that, when the process has access to a registry of the user terminal, determines the process as a malicious process on the basis of the malicious process information, receives the masqueraded registry information for masquerading as the virtual machine from the virtual machine information database, and returns the received information to the process.

9. The device of claim 7, wherein the global hooking module determines the process as a malicious process when the process is not included in a white list that is a list of normal processes stored in the virtual machine information database.

10. The device of claim 7, wherein the global hooking module determines the process as a malicious process when a binary hash value of the virtual machine detection request is identical to a hash value of a malicious code stored in the virtual machine information database.

11. The device of claim 7, wherein the malicious process information is information for accessing at least one selected from a file of the user terminal, a network address of the virtual machine, and a registry of the user terminal.

12. The device of claim 7, wherein, when the process is found not to correspond to the malicious process as a result of the determination, the global hooking module transmits the virtual machine detection request to a window kernel of a user terminal, receives a normal value of the virtual machine detection request from the window kernel of the user terminal, and returns the received value to the process.

* * * * *